Patented Jan. 19, 1943

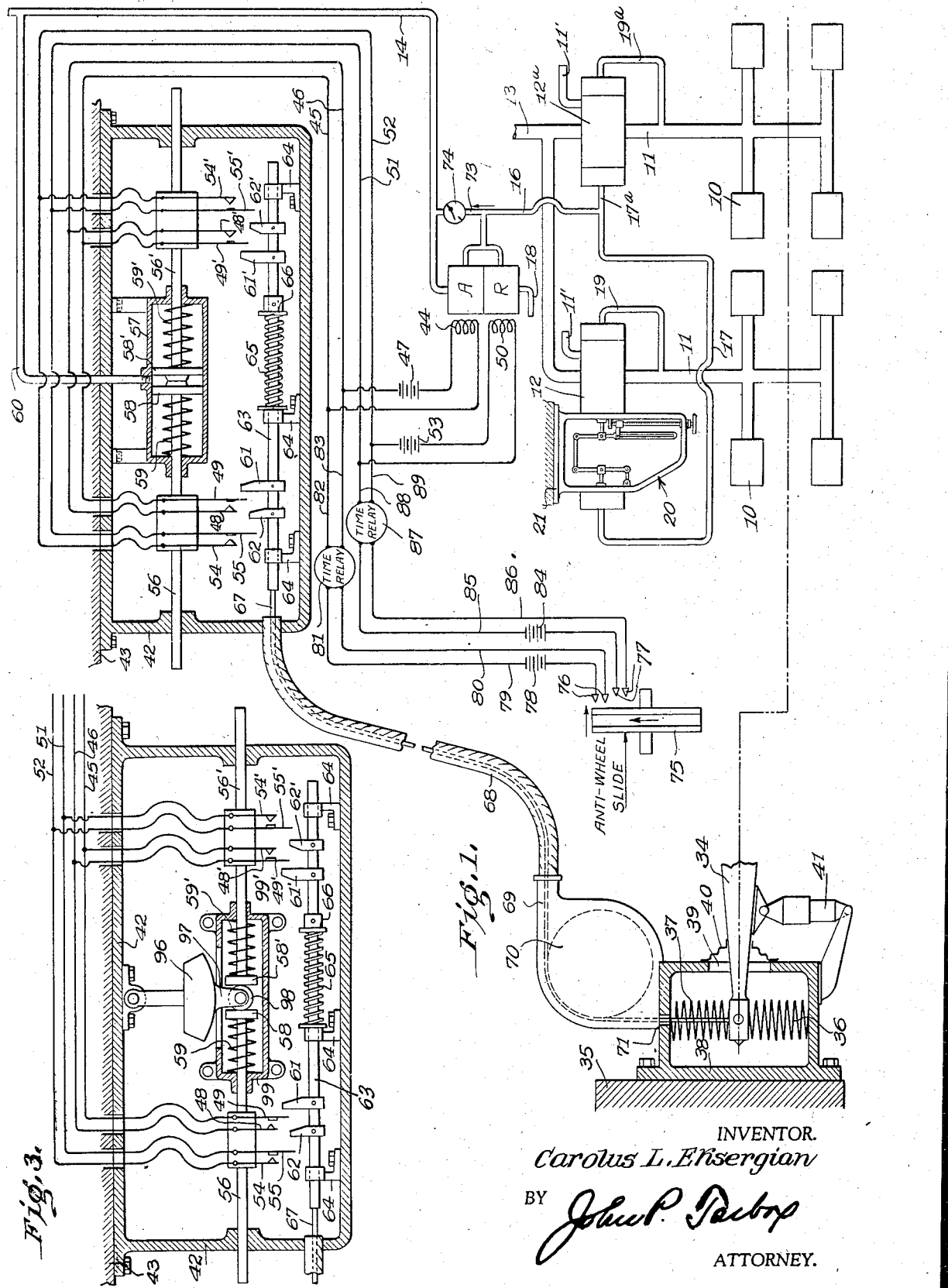

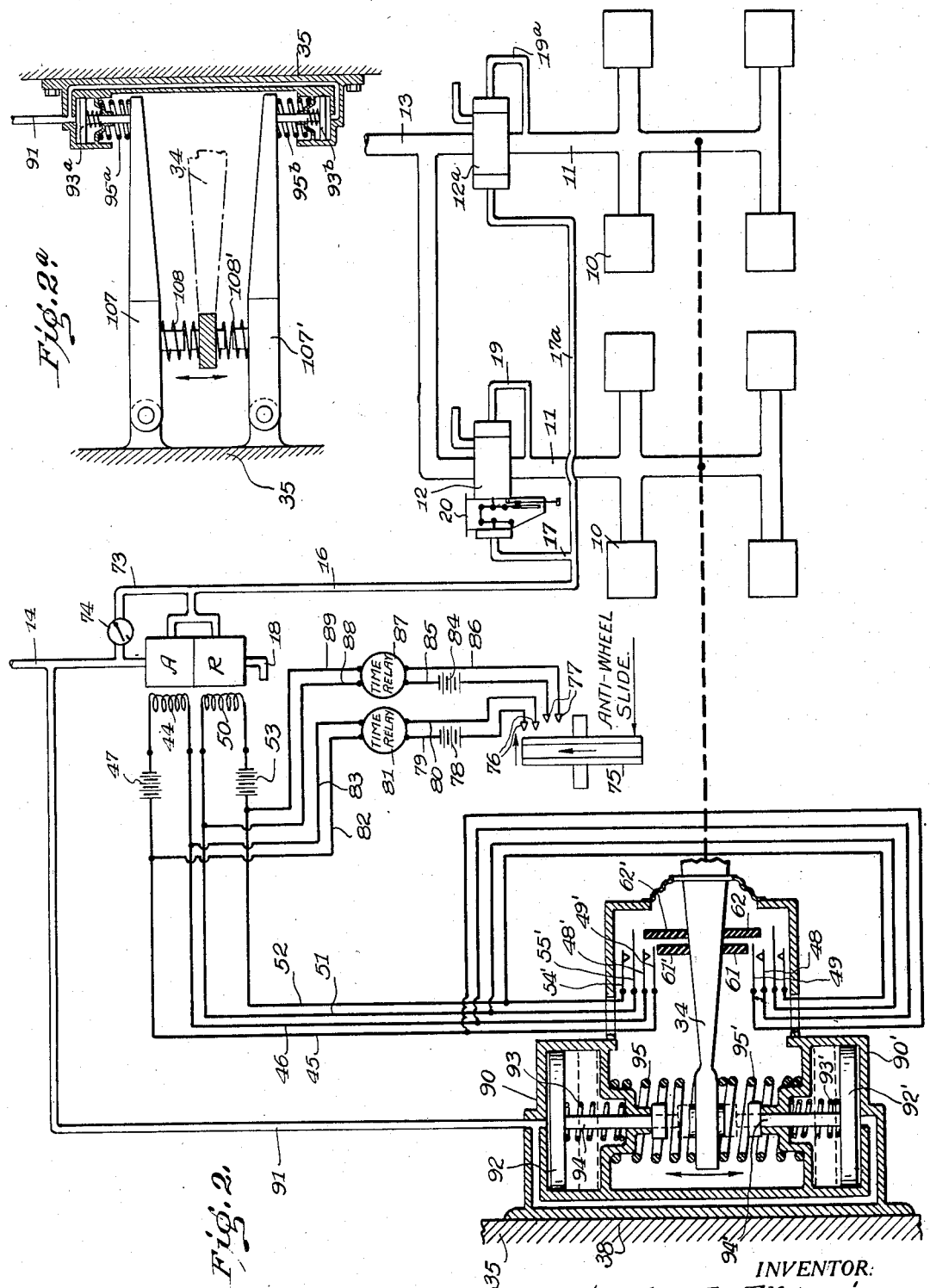

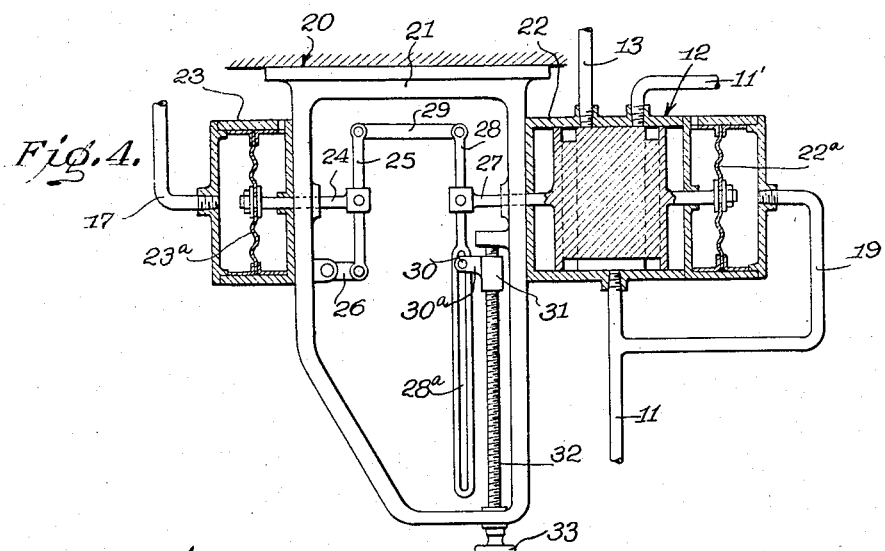
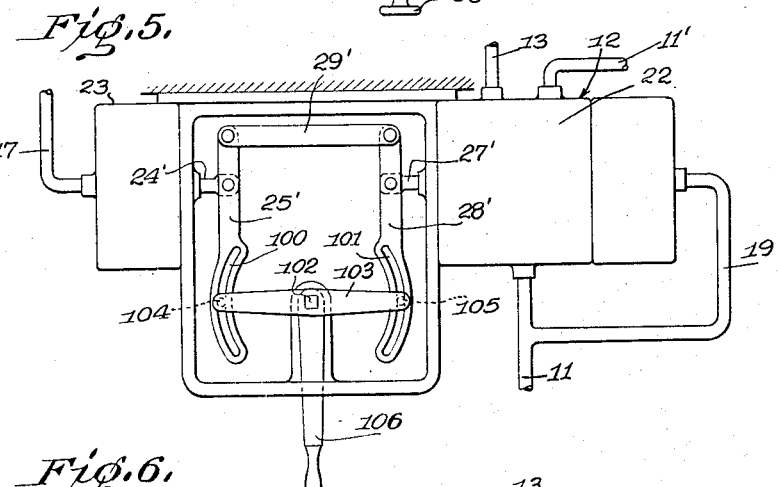
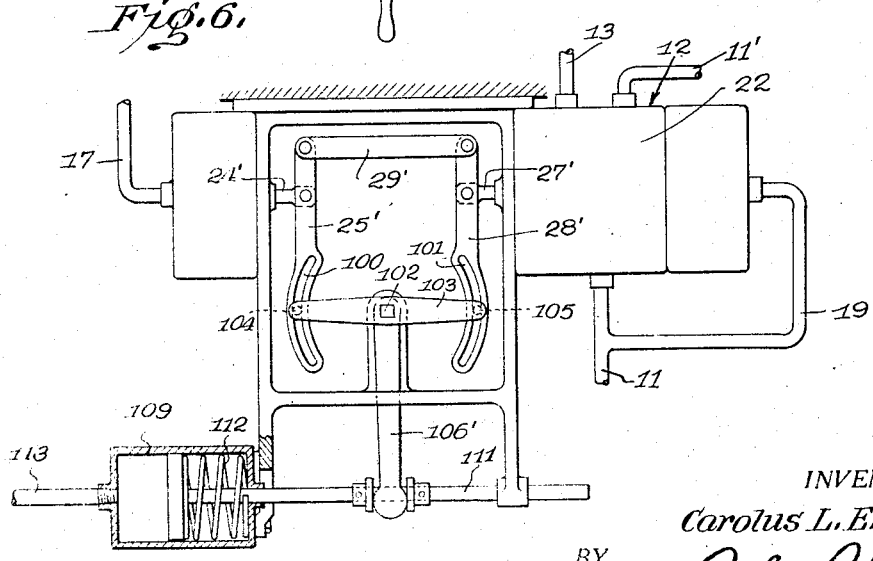

2,308,499

UNITED STATES PATENT OFFICE 2,308,499

BRAKING SYSTEM

Carolus L. Eksergian, Detroit, Mich., assignor to Budd Wheel Company, Philadelphia, Pa., a corporation of Pennsylvania Application May 1, 1939, Serial No. 271,081

26 Claims. (Cl. 303—21)

My invention relates to braking systems for railway vehicles. It has especial point to those systems in which it is endeavored to bring about a definite relation between the pressure of application and the braking torque produced. Such systems have been proposed heretofore, but there has been a great deal of uncertainty and indefiniteness of relation between the pressure of application and the braking torque produced. By pressure of application I mean that pressure which is put into the brake control line by the engineer, and with respect to which pressure he expects to gauge and determine the amount of braking on the train. Various forms of regulatory valves have been proposed and while some of these may have been used, they are unquestionably subject to many limitations. They not only have limited range but also are subject to disproportionate responses. From this angle such devices are not really and truly torque-control devices. They are but controlling of the pressure in the braking cylinder, and while this pressure in the braking cylinder may, under one condition or set of conditions among the innumerable conditions or sets of conditions applying to braking in actual service, be approximately proportional to the torque on the brake, in others it is disproportional and probably in the great majority is not even a remote approximation. The truth of this statement will be realized when it is conceived that one of the contributing factors alone has a three to one variation. This factor is the coefficient of friction between the cast-iron shoe, ordinarily used, and the tread of the wheel in a dry condition. Under wet conditions the variation of the coefficient of friction is as much as six to one. Even in certain of the modern radial disc brakes where the brake shoes are provided with composition linings, the variation in the coefficient of friction may be as much as two to one. Plainly, there can be under such conditions no real coordination between the braking torque and the applied pressure in the control line.

It is the prime object of my invention to directly gauge the torque actually produced, and to accurately coordinate or proportion this torque to the applied pressure in the brake control line. A second object of my invention, which coordinates with the first in importance, is the establishment of the proportionality between the applied pressure in the control line and the torque only when the maximum possible torque with a given pressure applied in the control line, is reached or slightly exceeded. From this angle it may be said that this object is really the prevention of the torque from exceeding an established maximum proportionality. A third object is the provision of means whereby the system operates upon reverse as well as forward movement of the railway vehicle.

Auxiliary objects are the tying in of the system with an anti-wheel slipping control, and the adjustment of the braking as between the front and rear trucks of the car, or as between the heavily and lightly-loaded ends of the car. The latter is of moment especially when but one torque control element is utilized for each car.

These objects I have attained through the employment of correlation of brake venting or brake dumping controls, or the means of reducing the pressure of brake application, the correlation of such elements with a radially extending brake shoe torque arm connected with the brake shoes.

These principal objects of my invention I achieve by establishing a constant measurement of the torque of the brakes, simultaneously establishing a measurement of the pressure in the brake control line and coacting these measurements to control the maximum pressure permissible in the brake cylinder for each particular pressure in the brake control line. In some cases I measure torque in terms of travel of a torque arm and pressure in terms of travel of a pressure-responsive member and render the maximum brake cylinder pressure subject to co-equal travel of such measurements. In other cases I measure the torque in pounds, the pressure in pounds, and render the pressure in the brake cylinder subject to an equating of such pound measurements. In yet others, I utilize resultant effects of the braking upon a vehicle, such as deceleration, and measure either the travel of the decelerometer or the force acting upon it, and coact such forces and travel measurements with the torque measurements in a manner similar to that heretofore set forth.

In the accompanying drawings I show several of the best forms of my invention now known to me.

Of these drawings

Fig. 1 is a diagrammatic showing of the torque control braking system of my invention in which the maximum permissible torque of the brakes is regulated for each brake application and determined by the pressure in the control line of the brakes.

Fig. 2 is a similar diagrammatic showing of that modification of my invention in which a measurement of torque in pounds and control line pressure in pounds combine to govern the pressure in the brake cylinder.

Fig. 2a is a slight modification of Fig. 2 showing the travel of the torque arm opposed by the pressure in the control line through a force multiplying device.

Fig. 3 is a diagram showing the substitution of a decelerometer for the pressure measuring device, and the pitting of the travel of the pendulum of the decelerometer against the travel of a torque arm to control the pressure in the brake cylinder.

Fig. 4 is a semi-diagrammatic illustration of one form of a means for securing an infinitely variable ratio in a relay valve which I may employ.

Fig. 5 is a semi-diagrammatic view of a modification of the device of Fig. 4.

Fig. 6 is also a modification of the device of Fig. 5 in which the adjustment of the device is automatically affected by air pressure in lieu of by hand.

Referring now first to Fig. 1, in the lower right of the diagram I have illustrated eight brake cylinders 10 in two groups of four each. Each group applies to the wheels of a single four-wheel truck, and it is assumed that the system at large is applied to a vehicle employing two of these trucks. The cylinders 10 of each group are connected in common by conduits 11 and as groups, respectively, through relay valves 12 and 12a commonly to the main reservoir (not shown) through a main conduit 13. A pilot or control line 14 from any form of control circuit is connected with the relay valves 12 and 12a through an application valve A and a line 16 connected by branches 17 and 17a to the respective relay valves 12 and 12a. A release valve R is also connected into the line 16, and through this valve, line 16 may be connected to the exhaust line 18. The relay valves 12 and 12a on their sides opposite the connection to the lines 17 and 17a are connected by short lines 19 and 19a, respectively, to the conduits 11 communicating with the respective brake cylinders 10. 11' are the exhaust pipes through which air is exhausted from the lines 11 and the brake cylinders 10 when the relay valves 12 and 12a are in the inoperative position to which they are moved when the pressure in the control line 14 is exhausted.

From this it will be seen that when the application valve A is open, the air from the control line 14 will pass to the relay valves 12 and 12a and operate them to close the exhausts 11' and to admit air from the main pressure cylinder through the line 13 to the brake cylinders.

The relay valves 12 and 12a may be of the usual balanced construction, one form of which will be described hereinafter, the position of which is controlled by the relative pressures on the opposite sides thereof as supplied by the lines 17, 19, and 17a, 19a, respectively. From this it will be seen that the pressure in the brake cylinders will be approximately that in the control line 14, for as soon as the pressure in the brake cylinders builds up to that of the control line or slightly higher, the relay valves will be returned to their intermediate positions cutting off pressure from the main cylinder line 13. If the pressure in the control line is exhausted, the relay valves will be operated to connect the lines 11 to the exhausts 11'.

In some cases it is desirable due to unequal loading of the trucks to apply less pressure to the cylinders 10 on one of the trucks than is applied to the cylinders of the other truck. In such case I may employ a regulator indicated at 20 in Fig. 1, more or less diagrammatically, and shown in more detail in Fig. 4. As shown in the detailed view, this regulator comprises an adjustable system of levers and links mounted on a base frame 21 between the main valve casing 22 of relay valve 12 and a cylinder 23 connecting at its outer end with the line 17. The piston or diaphragm 23a in the cylinder 23 is pivotally connected by a rod 24 to the central portion of a lever 25, the lower end of which is pivoted through a link 26 to the frame 21. The diaphragm 22a or piston connected to the main valve in the valve casing 22, is pivotally connected through the rod 27 to an intermediate portion of the lever 28, the upper arm of which is of a length equal to the upper arm of the lever 25 and is connected to it by link 29.

Provision is made for varying the effective length of the lower arm of the lever 28 and this end is provided throughout the major portion of its length which extends well below the lower end of the lever 25, with a slot 28a. The pivot 30 about which this lower end turns can be moved from end to end of this slot, being carried on a bracket 30a projecting from a nut 31 mounted on adjusting screw 32 carried by the frame 21 and adjustable by a head 33.

By this arrangement it will be seen that a quick adjustment has been provided for varying the ratio between the length of the levers 25 and 28, and this adjustment permits an infinite variation in the pressures acting on the brake cylinders of the respective trucks to compensate for the varying loads carried by the respective trucks.

The application and release valves A and R are controlled to regulate the pressure in the brake cylinders, as determined by the pressure in the control line 14 which is always under the operator's control, by the improved combined torque and pressure controlled system now to be described. According to one form of braking system to which my invention may be applied, the braking torque is transmitted to a torque arm 34, the free end only of which is shown in the diagrammatic view of Fig. 1. Such torque arms are fully disclosed in my prior application No. 198,398, filed March 28, 1938, now Patent #2,228,818, issued January 14, 1941, and are pivotally supported at one end to swing about the axis of an axle of the truck and at their remote or free ends, they are supported on a cross member 35 of the truck frame. Ordinarily such torque arm carries the braking shoes cooperating with the rotary brake members associated with the two wheels on the axle with which the arm is associated, and according to this invention it is carried at its free end between calibrated springs 36 and 37 bearing against opposite sides of the end of the arm and against opposite ends of a supporting casing 38 secured to the truck cross frame, and having an opening 39 through which the torque arm extends. A flexible diaphragm 40 may close the opening 29 to prevent the entrance of dirt. A dash pot 41 may be provided to damp the movement of the torque arm. It will be understood that the free end of the torque arm tends to move upward or downward against the tension of the springs 36 and 37 respectively as it becomes loaded by the brake application, the direction of movement being dependent upon the direction of movement of the truck.

It will be understood that although one such torque arm associated with one axle of the truck may suffice to control the braking in all of the brake cylinders associated with one car, it may under some conditions be desirable to have such torque control associated with each individual axle. In the present disclosure I have confined myself to showing one torque control arm for the two trucks of one car and this arm is shown as being operative to control the brakes in either direction of movement of the car.

The major portion of the control mechanism may according to this form of the invention be mounted in a casing 42 secured to the underframe of the car 43.

The control comprises two electric circuits, one controlling the application valve A and comprising the electromagnet or solenoid 44 for operating said valve, electric leads 45 and 46, battery or other source of energy 47, and the normally open switch contacts 48 and 49. The other control circuit controls the release valve R and comprises the electromagnet or solenoid 50 for operating said valve, the electric leads 51 and 52, the energy source or battery 53, and the normally open electric switch contacts 54 and 55. Additional contacts 54', 55', 48', and 49' are connected into the electric circuits in parallel with the contacts 54, 55, 48, and 49 respectively for operation in the reverse movement of the car.

The switch contacts 48—49 and 54—55 are carried by the piston rod 56 having one end supported by the end wall of the casing 42 and the opposite end supported by the end wall of a cylinder 57 secured centrally to one wall of the casing 42. The piston rod 56 has secured to it and arranged within the cylinder, the piston 58 which is normally urged toward the center of the cylinder by a spring 59. The similar piston 58' and piston rod 56', urged in one direction by a spring 59', is arranged at the opposite end of the casing and carries the contacts 48', 49', 54' and 55'. A branch line 60 from the control line 14 is connected to supply air pressure from the control line into the cylinder 57 between the piston 58 and 58' which are normally held separated a short distance by the central bosses projecting from their faces.

From this it will be seen that with the springs 59 and 59' properly calibrated, the movement of the pistons and of the contacts carried by the piston rods will be a measure of the pressure in the control line which pressure is under the operator's control.

Cooperating with the switches 48—49, 54—55, I provide a pair of circuit closers 61 and 62. Circuit closer 61 cooperates with contacts 48 and 49, and circuit closer 62 cooperates with contacts 54 and 55. Similarly I provide another pair of circuit closers 61' and 62' which cooperate respectively with the contacts 48'—49' and 54'—55'. All of these circuit closers are mounted for movement, parallel to the direction of movement of the contacts, on a rod 63 sliding in brackets 64 secured to the bottom of the casing 42. These circuit closers are normally spaced a relatively short distance from the switch contacts with which they cooperate, and are urged to this position by a spring 65 interposed between one of the brackets 64 and a fixed collar 66 secured to the rod 63.

In order that the movement of these circuit closers may be a measure of the torque, the rod 63 is connected to the end of the torque arm 34. This connection may take the form of a wire 67 attached to one end of the rod and extending through a flexible or Bowden cable 68 interconnecting the casing 42 and a housing 69 which is mounted on the supporting casing 38. In the housing 69 is mounted a pulley 70 around which the wire 67 is led through an opening 71 for securement at the end of the torque arm.

It will be seen by this arrangement that the application and release valves A and R are controlled through the cooperative influence of both the pressure in the control line 14 and the torque on the arm 34. The displacement of the contacts 48—49 and 54—55 of the control circuits is proportional to the pressure in the control line while the displacement of the circuit closers 61 and 62 associated with these contacts, is proportional to the torque. The operation of the device is as follows.

As the torque reaches a pre-determined high value under a given brake application pressure which corresponds to the pressure in the control line, the circuit closer 61 engages the contact 49 and closes the circuit operating the magnet 44 to close the normally open application valve A, preventing the passage of further air from the control line 14, to the line 16 and thus preventing further rise of pressure in the brake cylinders. If the torque continues to increase under this cylinder pressure, the circuit closer 62 moves against the contact 55 to close the circuit to the release valve magnet 50 thereby operating the normally closed release valve R to connect the line 16 to the exhaust line 18 and releasing through the relay valves the pressure in the brake cylinders. This, of course, causes the torque to drop below the pre-determined high value and eventually the circuits to the release and the application valves will be successively opened so that the brake pressure will again be applied direct from the control line 14 to the relay valves and through them to the brake cylinders.

The control mechanism operates identically as the torque moves the torque arm in the opposite direction through the sets of contacts and circuit closers at the opposite side of the control casing when the car to which the invention is applied moves in the opposite direction.

It will be evident that if the torque arm is urged only in one direction under the torque produced by the brake application, as it will be if the car movement is at all times in one direction, one-half of the control mechanism within the control box can be dispensed with, since a duplication is merely necessary where the torque arm is movable to register the torque in both directions of movement of the car.

To provide for the quick release of the brakes in the event of failure of the electrical system at a time when the application valve is held partially or wholly closed, I may provide a by-pass 73 between the control line 14 and the line 16, this by-pass being provided with a check valve 74 which prevents passage of air through it toward the brake cylinders, but allows a free passage of air from the brake cylinders when the pressure in the control line drops below the pressure in line 16.

Since it is desirable to set the device to secure the maximum permissible torque as defined by the rail adhesion, if the rail adhesion drops due to poor rail conditions, there may be times when wheel slide might occur. To guard against this, I propose to associate with the pressure, torque control device, hereinbefore described, an anti-wheel slide system which comes into action just before the wheel slide is likely to occur, to further reduce the pressure on the brake cylinders and thereby prevent wheel slide.

This anti-wheel slide system may comprise any suitable governor, either centrifugally-actuated or inertia-actuated, which is operative to close an electrical circuit or circuits upon a sudden drop in the speed of rotation of the wheel axle, such as occurs when the wheels commence to slip preliminary to sliding. In the drawings, Fig. 1, such a device is diagrammatically illustrated at 75 and adapted for cooperation with two pairs of switch points 76 and 77 by bridging these switch points to close the switches successively in the operation of the device. Electric connections may be provided which include the electromagnet 44 of the application valve and the electromagnet 50 of the release valve in the circuits controlled by these switches.

In the case of switch 76, these connections may comprise a circuit including a battery 78, electrical leads 79 and 80, and a time relay 81. The time relay closes the circuit including the leads 82 and 83, the battery 47, and the electromagnet 44. In the same manner the switch 77 controls the circuit including the battery 84, the leads 85 and 86, and a time relay 87. The time relay 87 in turn closes the circuit including the leads 88 and 89, the battery 53, and the electromagnet 50. Any suitable form of time relay may be employed such as will hold a circuit through the magnets closed for a pre-determined time only, after the relay has been energized.

By this arrangement the anti-wheel slide control will come into play if the track conditions are such as to bring about wheel slide under the torque and control line pressure conditions present at any given moment. Under normal track conditions the control of the braking would be almost wholly by the combined torque and pressure control devices, and the anti-wheel slide device would not come into play.

In the diagrammatic showing of the form of the invention illustrated in Fig. 2 the control is essentially the same in principle as that disclosed in Fig. 1. In this form, however, the movement of the torque arm is directly opposed by the selected control line pressure, and the switches controlling the electric circuits and operating the application and release valves, are associated directly with the end of the torque arm. In this figure corresponding parts are designated by corresponding reference numerals. Directly associated with the end of the torque arm 34 are the cylinders 90 and 90' arranged above and below the torque arm and carried by the transverse truck frame member 35. A branch 91 from the control line 14 communicates with the outer ends of both cylinders so that the pistons 92 and 92' operating in these cylinders are subjected to the pressure obtaining in the control line. The light springs 93 and 93' respectively urge the pistons to their outer position when not under the action of air pressure in the line 91. The pistons are provided with rods 94 and 94' which project through the inner ends of the cylinders in close proximity to the upper and lower faces of the torque arm. In addition the movement of the torque arm is opposed by upper and lower calibrated springs 95 and 95'.

When the pressure is applied to the control line 14 to apply the brakes, at the same time the pistons 92 and 92' are forced inwardly, the ends of their rods engaging the torque arm, and the torque arm is thus held under the combined action of the air pressure and the springs 95 and 95' centered between the cylinders 90 and 90' As in the previous modification, two sets of control switches are provided, in this case one set being arranged above the torque arm, and the other set below. The switches are given the same reference characters as in the preceding modification, and so are their circuit closers which in this case are mounted directly on the torque arm. Assuming now that the torque arm is moved upwardly against the tension of the spring 95 and the air pressure above the piston 92 until the circuit closer 61 closes the switch 48'—49', this will close the circuit and operate the application valve A to closed position. If the torque continues to rise, the torque arm will be further raised against the tension of the spring 95 and the air pressure on the piston 92 until the circuit closure 62' closes the switch contacts 54'—55', operating the release valve R to release some of the pressure from the brake cylinders. If the direction of the car movement is such as to cause the torque arm to move downwardly under the torque developed by the brakes, the switches 48—49 and 54—55 will be consecutively closed in the same order and with a like result, namely, the successive closing of the application valve and the opening of the release valve.

The principal difference between this form of the invention and the one previously described is the direct opposing of the torque in pounds and the combined air and spring pressure in pounds, whereas in the previous construction the pressure and the torque were both converted into linear displacements, thus permitting perhaps a more sensitive control than with the present form. Otherwise the operation of the two is identical.

As shown in Fig. 2a, the pistons and springs may, instead of coacting directly with the end of the torque arm, act thereon through a power multiplying arm or arms as through the levers 107—107' pivoted to the cross frame member 35 of the truck at one end and operated on by the opposed pistons 93a—93b, and springs 95a—95b, the pistons being as before under the pressure of the line 91. The torque arm has its end arranged between the levers and centered by springs 108—108', the engagement of the torque arm with levers being adjacent their pivot. This arrangement, by reason of the power multiplying levers 107—107', permits the employment of smaller pistons and springs than the arrangement shown in Fig. 2. The showing in this figure is diagrammatic and ordinarily the levers would extend transversely of the truck and parallel to the cross member 35, both the cylinders and the pivoted ends of the levers being supported on the same side of a single cross member, and the torque arm extending at right angles to the levers.

In the third modification, shown diagrammatically in Fig. 3, the construction is identical with that shown in the first modification, and the corresponding parts are similarly numbered throughout. The only point of difference is the opposing of the torque by a decelerometer instead of by the direct air pressure in the control line. The decelerometer is diagrammatically illustrated in Fig. 3 by a pendulum 96 suspended from the top of a casing 42 and having a downward projection 97 extending between the opposed pistons 58 and 58'. A roller 98 mounted on this extension bears against the inner faces of the pistons. The springs 59 and 59' acting on the pistons and on fixed abutments 99 and 99' supported from the casing, are calibrated so that the deflection of the inertia springs at full air pressure equals the deflection of the torque arm springs 36—37 at the maximum permissible torque defined by the rail adhesion.

It will be seen that in this modification the combined action of the torque on the brakes and the deceleration rate as it affects the pendulum 96, together control the closing of the circuits which control the application and release valves in the brake control line. Except for the substitution of the decelerometer control for selected air pressure control, the two systems are identical.

In Fig. 5 is shown a modification of the graduated ratio adjuster for the relay valves. According to this modification the levers 25' and 28' corresponding to the levers 25 and 28 of Fig. 4 are of identical length and mounted in an identical manner to the opposed piston rods 24' and 27'. Their lower arms are extended and provided with arcuate slots 100 and 101. At the center of the circle from which the arms are struck at 102, is pivoted a lever 103 which has at its ends pins 104 and 105 engaging in the slots 100 and 101 respectively. A handle 106 is connected to the shaft to rotate the lever 103. Swinging of the handle in either direction produces a differential ratio between the arms of the levers and thus brings about a differential adjustment between the brake cylinder pressures controlled by the respective relay valves similar to that brought about by the form shown in Fig. 4. It is obvious that this is just another form of quick adjustable variable ratio differential valve mechanism which might be used in place of that shown in Fig. 4.

In Fig. 6 is shown a modification of the device of Fig. 5 in which the arm 106' corresponding to the manually controlled arm, is automatically operated in either direction to effect the adjustment in accordance with the variation in pressure in an air conduit 113. According to this arrangement, a cylinder 109 in which a piston operates is connected by a piston rod 111 to the arm 106', a spring 112 opposing the pressure of the air in conduit 113. As shown in the drawing the air pressure and spring are arranged so that the spring is placed under some compression by the air pressure and the arm is held central. With variation of air pressure in conduit 113 above or below that applied as shown, the arm will be automatically shifted to right or left. The automatic control might be made dependent upon the pressure in the control line, as 14, Fig. 1, or upon variations in the loading of front and rear trucks as desired.

While I have herein disclosed several specific forms which the invention may take, it will be understood that I contemplate the inclusion of other modifications which may readily occur to one skilled in the art, within the scope of the appended claims.

What I claim is:

1. A control device for vehicle brakes in which the brakes are applied by air pressure under an operator's control and operate upon a torque arm movable proportionally to the torque delivered thereto by the brakes associated therewith, spring means opposing the movement of said torque arm but arranged to be overcome under a predetermined torque, a control line for effecting the supply of air pressure to the brakes, the pressure in said control line assisting said spring means in opposing the movement of the torque arm, and means controlled by the conjoint action of the pressure in the control line and the movement of the torque arm under the braking torque for affecting the brake cylinder pressure when a predetermined torque for the selected control line pressure is attained.

2. A control device for vehicle brakes, a brake cylinder for actuating the brakes associated with a principal load-carrying wheel of said vehicle, a control line for admitting compressed air to the brake cylinder under the control of the operator, a valve device in said control line, automatic means including a member movable under the torque exerted by the brakes actuated by said cylinder and an electrical circuit controlled thereby for actuating said valve device to reduce the pressure in the brake cylinder when the braking torque reaches a predetermined maximum for the selected pressure in the control line, said electrical circuit comprising a switch in said circuit normally open but arranged to be closed by said member when the torque reaches said maximum, but to be opened to restore the parts to normal immediately the torque drops below said maximum.

3. A control device for vehicle brakes, a brake cylinder for actuating the brakes associated with a principal load-carrying wheel of said vehicle, a control line for admitting compressed air to said cylinder under the control of the operator, and automatic means subject to the control line pressure for reducing the pressure in the brake cylinder when the braking torque of the brakes actuated by said cylinder reaches a predetermined maximum for the selected pressure, and an anti-wheel slide device automatically operative upon wheel slip to reduce the pressure in the brake cylinder independently of said automatic means if conditions favoring wheel slide occur while the braking torque is below said maximum.

4. A control device for vehicle brakes, a brake cylinder for actuating the brakes, a control line for admitting compressed air to the brake cylinder under the control of the operator, a valve device in said control line, automatic means for actuating said valve device to reduce the pressure in the brake cylinder when the braking torque reaches a predetermined maximum for a selected pressure in the control line, said means including an electric circuit having a normally open switch comprising spaced switch points mounted for translating movement in response to the pressure in the control line, and a circuit closer also mounted for translating movement in a parallel path and in response to the braking torque.

5. A control device for vehicle brakes, a brake cylinder for actuating the brakes, a control line for admitting compressed air to said cylinder under control of the operator and automatic means for reducing the pressure in the brake cylinder when the braking torque reaches a predetermined maximum for the selected pressure, said means including an electric circuit including a normally open switch, a movable torque arm for closing said switch when said maximum torque is reached, the movement of said arm being directly opposed by a piston actuated by said selected air pressure.

6. A control device according to claim 5 in which a force multiplying device is inserted between the arm and the piston.

7. A control device for vehicle brakes, a brake cylinder for actuating the brakes, a control line for admitting compressed air to the brake cylinder under control of the operator, automatic means for reducing the pressure in the brake cylinder when the braking torque reaches a predetermined maximum, said means including an electric circuit comprising a switch having spaced switch points mounted for translating movement and means for causing such translating movement of the switch points, and a circuit closer also mounted for translating movement in a parallel path and in response to the braking torque.

8. Vehicle brake equipment comprising, in combination, fluid pressure operated brake means for exerting a braking force on a vehicle wheel, means subject and responsive to the torque force exerted on the brake means during an application of the brakes, said torque responsive means having a normal position when the brake means is released and adapted to move in opposite directions from the normal position depending upon the direction of rotation of the vehicle wheel at the time the brake means is applied, a control pipe chargeable with fluid at different pressures corresponding to a selected degree of application of the brake means, a pair of movable abutments each subject on one side to the pressure established in said pipe and arranged in a manner so that the fluid pressure force exerted on one abutment opposes the movement of the torque responsive means in one direction out of its normal position and the fluid pressure force exerted on the other abutment opposes movement of the torque responsive means in the opposite direction out of its normal position, valve means operative in response to movement of the torque responsive means in either direction out of its normal position to control the supply of fluid under pressure to and the release of fluid under pressure from the fluid pressure operated means so as to regulate the degree of application of the brake means to a value corresponding to the degree of pressure established in the said pipe.

9. Vehicle brake equipment comprising, in combination, fluid pressure operated brake means for exerting a braking force on a vehicle wheel, means subject and movably responsive to the torque force exerted on the brake means during an application of the brakes, resilient means normally maintaining said torque responsive means in a certain normal position, a control pipe chargeable with fluid at different pressures corresponding to a selected degree of application of the brake means, a movable abutment subject to the pressure in the said pipe and having a stem normally out of engagement with said torque responsive means and adapted to be engaged by the torque responsive means upon displacement thereof out of its normal position, and valve means adapted to be operated in response to the movement of the torque responsive means to control the supply of fluid under pressure to the fluid pressure operated brake means and the release therefrom in a manner such as to cause the brake means to exert a substantially constant braking force corresponding to the degree of pressure established in said pipe.

10. In a vehicle brake equipment of the class including friction means for applying braking force to a wheel and control apparatus comprising operating means for establishing a fluid pressure which is variable according to any desired degree of application of the brakes, in combination, a mechanism subject to the forces of said fluid pressure and of braking torque produced during operation of said friction means, and means operative by said mechanism for controlling the application and release of the brakes to produce a retarding force which is maintained so as to vary directly as the degree of fluid pressure established by said control apparatus.

11. In a vehicle fluid pressure brake equipment of the class including fluid pressure operated friction brake mechanism operable to apply braking force to the wheel, a control pipe, and means for varying the pressure of fluid in said control pipe in accordance with any desired degree of application of the brakes, in combination, electro-responsive valve means operative to control the supply and release of fluid under pressure to and from said brake mechanism, and control switch means operative to control the circuits for said electro-responsive valve means in accordance with relative variations in the pressure of fluid in said control pipe and in braking torque produced by operation of said friction brake mechanism.

12. In a vehicle brake mechanism of the class including rotary friction means revolving with the wheel of the vehicle and non-rotatable friction means movable into braking relation therewith and means operable to establish a control fluid pressure variable in accordance with any desired degree of application of the brakes, in combination, a torque arm connected to said non-rotatable friction means and subject to braking torque produced during an application of the brakes, brake-controlling means operative to control said brake mechanism for effecting application and release of the brakes, and pressure differential mechanism subject to the opposed forces of said control pressure and of said braking torque on the torque arm for governing said brake-controlling means.

13. In a vehicle brake equipment comprising fluid pressure operated brake means for exerting a braking force on a vehicle wheel, in combination means subject and movably responsive to the torque force exerted on the brake means due to application thereof, a control pipe chargeable with fluid at different pressures according to a selected degree of application of the brake means, a movable abutment subject to the pressure in said pipe adapted to be engaged by the torque-responsive means to oppose movement thereof out of a normal position, and valve means operable in response to the movement of the torque-responsive means to control the pressure supplied to the fluid pressure operated brake means in a manner to produce a retarding force which is maintained at a value corresponding to the pressure established in the said control pipe.

14. In a vehicle brake equipment of the class including friction means for applying braking force to a wheel; in combination, a control apparatus comprising operating means for establishing a fluid pressure which is variable according to any desired degree of application of the brakes, a mechanism subject to the forces of said fluid pressure and of braking torque produced during operation of said friction means, and means operative by said mechanism for regulating the operation of said friction means to produce a retarding force which is maintained so as to vary directly as said fluid pressure established by the control apparatus.

15. In a vehicle fluid pressure brake equipment of the class including fluid pressure operated friction brake mechanism operable to apply braking force to a wheel, a control pipe, and means for varying the pressure of fluid in said control pipe in accordance with any desired degree of application of the brakes; in combination, valve means operative to control the supply and release of fluid under pressure to and from said brake mechanism, and valve actuating means subject to the opposing forces of said variable control pipe pressure and of the braking torque produced by operation of said friction brake mechanism for producing a retarding effect that is directly proportional to the degree of fluid pressure established in said control pipe.

16. In a vehicle fluid pressure brake equipment of the class including fluid pressure operated friction brake mechanism operable to apply braking force to a wheel, a control pipe, and means for varying the pressure of fluid in said control pipe in accordance with any desired degree of application of the brakes; in combination, valve means operative to control the supply and release of fluid under pressure to and from said brake mechanism, and actuating means for said valve means responsive to cooperating opposing forces resulting from the pressure of fluid in said control pipe and from braking torque produced by operation of said friction brake mechanism, said valve-actuating means being operative when said control pipe pressure overbalances said braking torque to effect an application of the brakes, when said braking torque overbalances said control pipe pressure to effect the release of the brakes, and when said two forces are balanced to maintain the condition of the brakes unchanged.

17. In a brake mechanism for a railway truck friction brake mechanism operable to apply braking force to a wheel, in combination means for actuating said brake mechanism, and control means responsive to the opposing forces of the braking torque produced by operation of said brake mechanism and of a control force varying in accordance with the desired degree of application of the brakes, said control means being operative for maintaining a retarding force directly proportional to said control force, and when the braking torque exceeds said control force, for initiating release of the brakes.

18. In a brake mechanism for a railway truck a friction brake mechanism operable to apply braking force to a wheel, in combination means for actuating said brake mechanism, means establishing a control force varying in accordance with any desired degree of application of the brakes, and control means operative to control application, holding and release operation of the brake mechanism in response to the braking torque produced by said brake mechanism as opposed by the established control forces to maintain the retarding force directly proportional to the control force established during the application of the brakes.

19. In a vehicle fluid pressure brake equipment of the class including fluid pressure operated friction brake mechanism operable to apply braking force to the wheel, a control pipe, and means for varying the pressure of fluid in said control pipe in accordance with any desired degree of application of the brakes; in combination, electro-responsive valve means operative to control the supply and release of fluid under pressure to and from said brake mechanism, and control switch means operative to control the circuits for said electro-responsive valve means in accordance with relative variations in the pressure of fluid in said control pipe and in braking torque produced by operation of said friction brake mechanism.

20. In a vehicle fluid pressure brake equipment of the class including a fluid pressure operated friction brake mechanism operable to apply braking force to a wheel, a control pipe, and means for varying the pressure of fluid in said control pipe in accordance with any desired degree of application of the brakes; in combination, electro-responsive valve means operative to control the supply and release of fluid under pressure to and from said braking means, switch means controlling circuits for said electro-responsive valve means, and means subject to the opposed forces of said control pipe pressure and of braking torque produced by operation of said brake mechanism for actuating said switch means.

21. In a vehicle fluid pressure brake equipment of the class including a fluid pressure operated friction brake mechanism operable to apply braking force to a wheel, a control pipe, and means for varying the pressure of fluid in said control pipe in accordance with any desired degree of application of the brakes; in combination, electro-responsive valve means operative to control the supply and release of fluid under pressure to and from said braking means, switch means controlling circuits for said electro-responsive valve means, a movable element responsive to control pipe pressure, and a movable element responsive to braking torque produced by operation of the brake mechanism, said two movable elements being cooperative for controlling said switch means.

22. In a vehicle brake equipment comprising fluid pressure operated brake means for exerting a braking force on a vehicle wheel, in combination a control pipe chargeable with fluid at different pressures corresponding to a selected degree of application of the brake means, valve means controlling the supply of fluid under pressure to the fluid pressure operated brake means and the release of fluid under pressure therefrom, and means controlled in accordance with the opposing relation of the pressure in said pipe and the torque on said brake means for effecting operation of said valve means so as to maintain the retarding force due to the application of the brake means proportional directly to the pressure established in said pipe.

23. In a vehicle brake equipment comprising fluid pressure operated brake means for exerting a braking force on a vehicle wheel, in combination a control pipe chargeable with fluid at different pressures corresponding to a selected degree of application of the brake means, valve means controlling the supply of fluid under pressure to the fluid pressure operated brake means and the release of fluid under pressure therefrom, means subject to the pressure in said pipe, and means subject to the torque exerted on the fluid pressure operated brake means upon an application thereof, said last two means functioning cooperatively in opposing relation to effect the operation of said valve means to regulate and maintain the retarding force caused by the application of the brake means at a degree directly proportional to the pressure established in said pipe.

24. In a vehicle brake equipment comprising fluid pressure operated brake means for exerting a braking force on a vehicle wheel, in combination means subject to the torque exerted on the fluid pressure operated brake means due to application thereof, means for resisting movement of the last said means out of a normal position with a force varying according to a selected degree of application of the brake means, and valve means controlling the supply and the release of fluid under pressure to and from said fluid pressure operated brake means operative according to the movement of said torque responsive means as modified by the selected application force to so control the pressure supplied to the fluid pressure operated means as to maintain the retarding force produced by application of the brake means at a substantially constant value directly proportional to the force exerted by the said movement-resisting means.

25. In a vehicle brake of the type involving rotary means having a friction surface revolving with a wheel of a vehicle and brake means movable into braking relation with said surface, in combination, torque means associated with said rotary means and subject to braking torque reacting thereon during an application of the brakes, means operable to establish a control fluid pressure variable in accordance with any desired degree of application of the brakes, brake-controlling means operative to effect application and release of the brakes, and apparatus constructed and arranged to measure the relative variations in said control pressure and said braking torque for governing said brake-controlling means in direct proportion to said control pressure, whereby a retarding force is produced upon the application of the brakes which is always maintained directly proportional to said variable control fluid pressure.

26. In a vehicle brake of the type involving rotary means having a friction surface revolving with a wheel of a vehicle and brake means movable into braking relation with said surface, in combination, torque means associated with said rotary means and subject to braking torque reacting thereon during an application of the brakes, means operable to establish a control fluid pressure variable in accordance with any desired degree of application of the brakes, brake-controlling means operative to effect application and release of the brakes, and means governing said brake-controlling means and constructed and arranged to respond to the mutual effect of the selected control pressure and of said braking torque as opposed by said control pressure, whereby the retarding force caused by application of the brakes is always regulated and maintained directly proportional to said variable control fluid pressure.

CAROLUS L. EKSERGIAN.